United States Patent [19]
Howard

[11] Patent Number: 5,644,224
[45] Date of Patent: Jul. 1, 1997

[54] DUAL BRUSHLESS RESOLVER RATE SENSOR

[75] Inventor: David E. Howard, Hazel Green, Ala.

[73] Assignee: The United States of America as represented by the Administrator of the National Aeronautics and Space Administration, Washington, D.C.

[21] Appl. No.: 613,803

[22] Filed: Mar. 8, 1996

[51] Int. Cl.$^6$ .............................. G01P 3/52; G01P 13/00; G08B 21/00; G05B 1/06

[52] U.S. Cl. .......................... 324/165; 324/163; 340/672; 318/661

[58] Field of Search ................................ 324/160, 163, 324/164, 165, 207.25; 340/671, 672; 318/605, 606, 607, 608, 652, 661

[56] References Cited

U.S. PATENT DOCUMENTS 3,858,109 12/1974 Liden ................................... 324/163

OTHER PUBLICATIONS

*NASA Tech Briefs*, Measuring Speed of Rotation With Two Brushless Resolvers, Apr. 3, 1995, p. 34, David E. Howard.

*Primary Examiner*—Walter E. Snow
*Attorney, Agent, or Firm*—Robert L. Broad, Jr.

[57] ABSTRACT

A resolver rate sensor is disclosed in which dual brushless resolvers are mechanically coupled to the same output shaft. Diverse inputs are provided to each resolver by providing the first resolver with a DC input and the second resolver with an AC sinusoidal input. A trigonometric identity in which the sum of the squares of the sin and cosine components equal one is used to advantage in providing a sensor of increased accuracy. The first resolver may have a fixed or variable DC input to permit dynamic adjustment of resolver sensitivity thus permitting a wide range of coverage. In one embodiment of the invention the outputs of the first resolver are directly inputted into two separate multipliers and the outputs of the second resolver are inputted into the two separate multipliers, after being demodulated in a pair of demodulator circuits. The multiplied signals are then added in an adder circuit to provide a directional sensitive output. In another embodiment the outputs from the first resolver is modulated in separate modulator circuits and the output from the modulator circuits are used to excite the second resolver. The outputs from the second resolver are demodulated in separate demodulator circuit and added in an adder circuit to provide a direction sensitive rate output.

15 Claims, 3 Drawing Sheets

5,644,224

DUAL BRUSHLESS RESOLVER RATE SENSOR

ORIGIN OF THE INVENTION

This invention was made by employees of the United States Government and may be manufactured and used by or for the Government for governmental purposes without the payment of any royalties.

BACKGROUND OF THE INVENTION

FIELD OF THE INVENTION

This invention relates to rate sensors and more particularly to an accurate analog angular rate sensor which is implemented without mechanical brushes.

Prior art devices include: brush type direct current (DC) tachometers; resolver or hall effect devices used in conjunction with two phase brushless motors; and differentiating position data obtained from resolvers. Some prior art devices are disclosed in U.S. Pat. Nos. 3,858,109 issued Dec. 31, 1974 to Sam P. Niden; 4,060,799 issued Nov. 29, 1977 to Donald P. Jones; 4,199,800 issued Apr. 22, 1980 to James G. Weit; 4,755,751 issued Jul. 5, 1988 to Glen Ray; 4,901,566 issued Feb. 20, 1990 to Antoine Boetsch; 4,962,331 issued Oct. 9, 1990 to Charles G. Smith.

A disadvantage of brush type DC tachometers is that brushes tend to be unreliable. This is particularly true in space environment use such as space station mechanisms, etc.

One disadvantage of resolver of hall type devices used in conjunction with two phase brushless motors is that the hall devices and off the shelf motors do not always produce clean and accurate sinusoidal waveforms. This directly translates into rate error. On the other hand resolvers are usually designed for very high accuracy. A second disadvantage of utilizing a brushless motor (or a DC brush type tachometer) is that in a redundant system if the motor or DC brush type tachometer happens to fail with a shorted winding their associated back electromagnetic field (emf) is shorted. This results in an additional torque which the redundant system (if mounted to a common output shaft) will have to overcome.

A disadvantage of differentiating position data from resolvers is that electronic differentiating tends to be very noisy. Also to accomplish an accurate rate signal the sinusoidal signals from the resolver must be selectively switched to the input of the differentiator depending on the angle of rotation. This switching also has a tendency to be noisy. This method also has limited accuracy at low rates.

It is an object of the present invention, therefore, to provide a brushless resolver rate assembly to overcome the disadvantages of the above mentioned prior art devices.

SUMMARY OF THE INVENTION

A resolver rate sensor is disclosed in which dual brushless resolvers are mechanically coupled to the same output shaft. Diverse inputs are provided to each resolver by provided the first resolver with a DC input and the second resolver with an AC sinusoidal input. A trigonometric identity in which the sum of the squares of the sin and cosine components equal one is used to advantage in providing a sensor of increased accuracy. The first resolver may have a fixed or variable DC input to permit dynamic adjustment of resolver sensitivity thus permitting a wide range of coverage.

DESCRIPTION OF THE PREFERRED EMBODIMENTS

Figure 1:
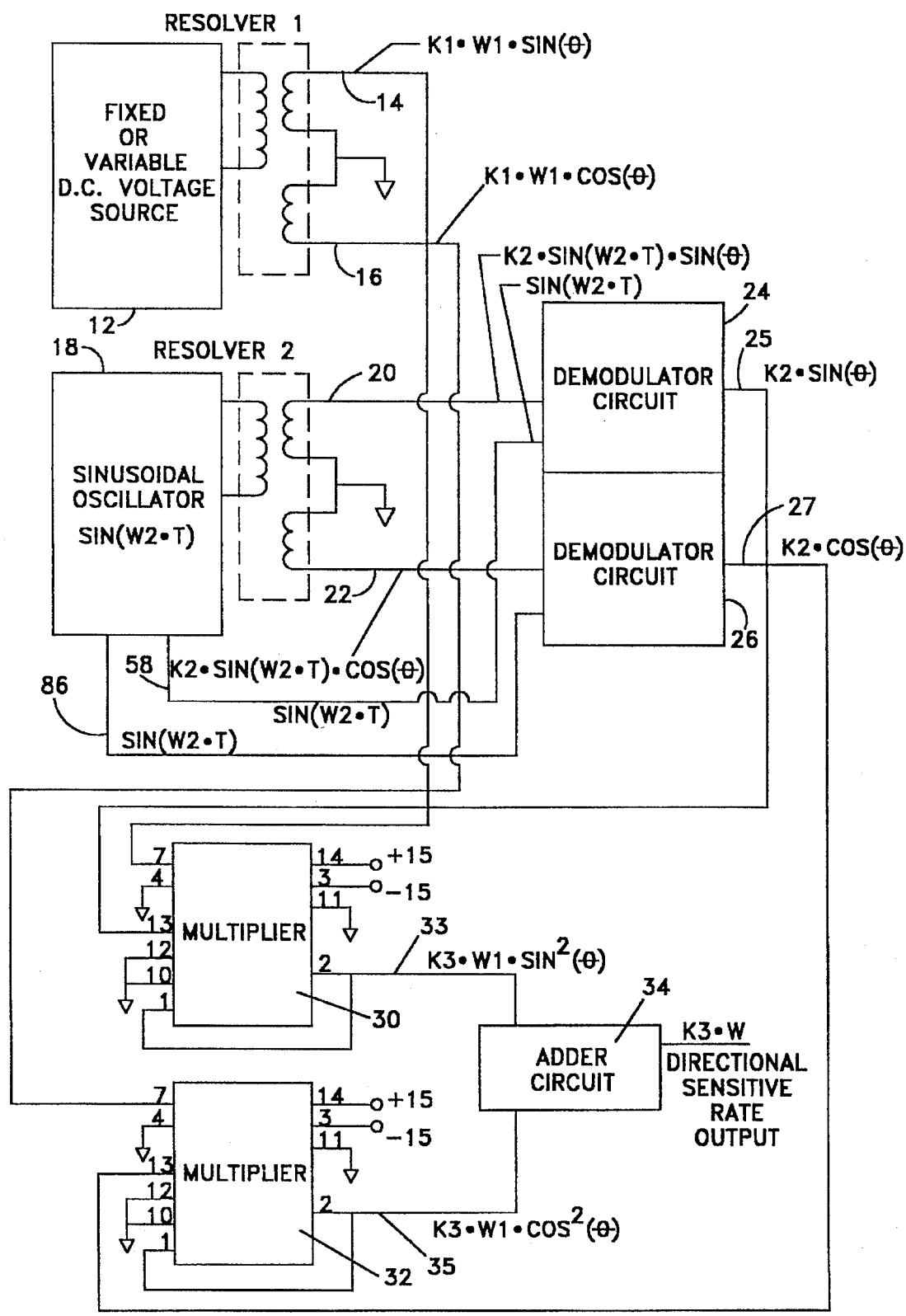
FIG. 1 is a block diagram of one embodiment of the invention wherein a pair of resolvers are coupled so that the first resolver is excited with a direct current (DC) voltage and the second resolver is excited with a sinusoidal function.

FIG. 1 is a block diagram of the preferred embodiment of the invention. Resolver 1 and resolver 2 are mechanically coupled together. To obtain the maximum sensitivity of the rate output, the two resolvers should be mechanically aligned such that their electrical outputs are in phase (this is a standard procedure). The sensitivity will degrade if the electrical outputs are not in phase.

As seen in FIG. 1, resolver 1 is excited with a direct current (DC) voltage from a voltage source 12. This results in the two outputs 14 and 16 of the resolver being as follows:

(EQ1) $K_1 * w_1 * \sin(\theta)$ and (EQ2) $K_1 * w_1 * \cos(\theta)$ where: $\theta$ is the shaft angle, $w_1$ represents angular rate, and $K_1$ is a constant. $K_1$ is derived from the surface area of the resolver, the number of turns of the resolver, and the magnitude of the DC excitation voltage.

Resolver 2 is excited with a sinusoidal function generated in an oscillator 18. This results in the two outputs 20 and 22 of resolver 2 being as follows (this is the normal operation of a resolver):

(EQ3) $K_2 * \sin(w_2 * t) * \sin(\theta)$ and (EQ4) $K_2 * \sin(w_2 * t) * \cos(\theta)$ where: $\sin(w_2 * t)$ is the excitation signal to the resolver, $\theta$ represents the shaft angle, and $K_2$ is derived from the surface area of the resolver, the number of turns of the resolver, and the magnitude of the excitation voltage.

The two outputs 20 and 22 of resolver 2 are then respectively demodulated in demodulator circuits 24 and 26 resulting, respectively, in two output signals 25 and 27 defined by:

(EQ5) $K_2 * \sin(\theta)$ and (EQ6) $K_2 * \cos(\theta)$ where: $\theta$ represents the shaft angle and $k_2$ is a constant.

Utilizing a simple trigonometric identity the output signals 14 and 16 from resolver 1 can be combined with the demodulated signals 25 and 27 from resolver 2 to produce an accurate rate signal which is directional sensitive. The trigonometric identity utilized is as follows:

(EQ7) $\cos^2\theta + \sin^2\theta = 1$

By multiplying signals labeled EQ1 (output 14 from resolver 1) and EQ5 (output 25 from demodulator circuit 24) together in a multiplier 30 and multiplying signals labeled EQ2 (output 16 from resolver 1) and EQ6 (output 27 from demodulator 26) together in a multiplier 32 and adding the results in an adder 34 the following results are obtained.

$$K_1 * w_1 * \sin(\theta) * K_2 * \sin(\theta) + K_1 * w_1 * \cos(\theta) * K_2 * \cos(\theta)$$
$$= K_1 * w_1 * K_2 * \sin^2\theta + K_1 * w_1 * K_2 * \cos^2\theta$$
$$= K_1 * w_1 * K_2 * [\sin^2\theta + \cos^2\theta]$$

substituting the above given trigonometric identity (EQ7) yields:

$$= K_1 * w_1 * K_2 = K_3 * w_1$$

where: $K_3$ is a constant equal to $K_1 * K_2$ and $w_1$ represents the angular rate. The result $K_3 * w_1$ is also directional sensitive (i.e. the sign of $K_3 * w_1$ changes depending on the direction of rotation).

Figure 3:
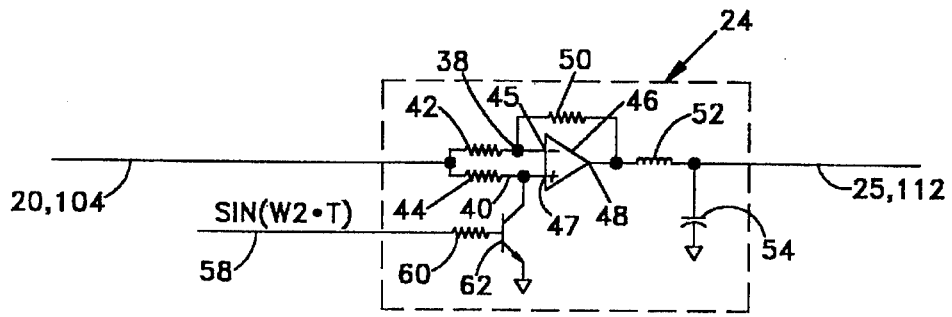
FIG. 3 is a schematic illustration of one demodulator circuit of FIG. 1.
Figure 4:
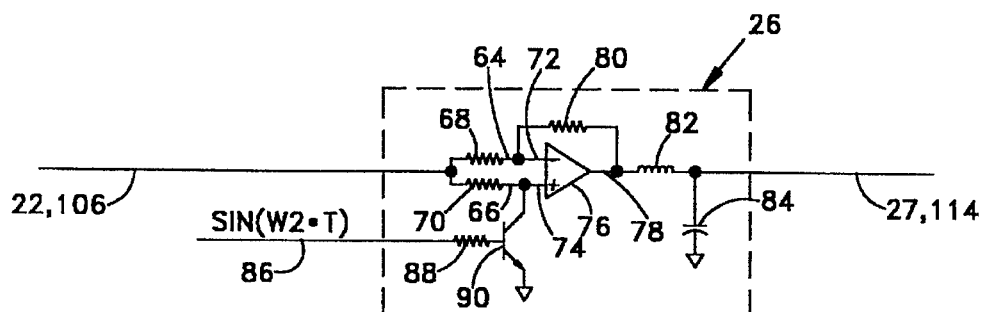
FIG. 4 is a schematic illustration of the second demodulator of FIG. 1.

Demodulator circuits 24 and 26 of FIG. 1 are identical except for the inputs and outputs and are illustrated in FIGS. 3 and 4. As seen in FIG. 3 output 20 from resolver 2 serves as in input to demodulator 24 and provides inputs 38 and 40, respectively, through parallel resistors 42 and 44 to the inverting and positive inputs of 45 and 47, respectively, of op-amp 46 having an output 48. A feedback resistor 50 is shown connected between output 48 and input 38 of op-amp 46. An induction coil 52 and a capacitor 54 are connected to output 25 of op-amp 46.

Oscillator 18 generates a carrier wave output 58 ($w_2 * t$) which is inputted through a resistor 60 (FIG. 3) to a transistor 62 and into the positive input 42 of op amp 46. The emitter of transistor 62 is connected to ground.

As seen in FIG. 4 output 22 from resolver 2 serves as an input to demodulator 26 and provides inputs 64 and 66, respectively, through parallel resistors 68 and 70 to the inverting and positive inputs 72 and 74, respectively, of an op-amp 76 having an output 78. A feedback resistor 80 is shown connected between output 78 and input 72 of op-amp 76. An induction coil 82 and a capacitor 84 are connected to output 48 of op-amp 76.

Oscillator 18 generates a carrier wave output 86 which is inputted through a resistor 88 (FIG. 4) to a transistor 90 and into the positive input 74 of op-amp 76.

Figure 5:
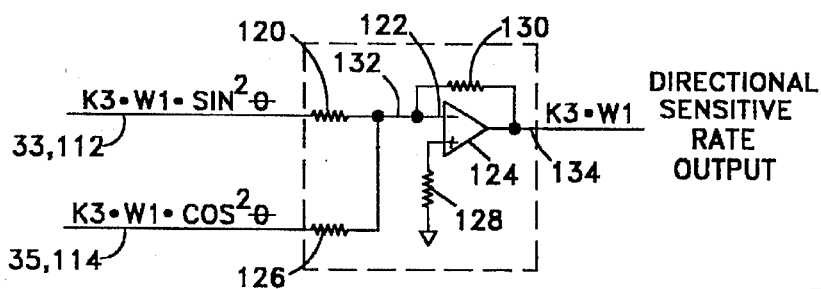
FIG. 5 is a schematic illustration of the adder circuit used in FIGS. 1 and 2.

As seen in FIG. 5, an adder circuit 34 receives, as inputs, the output 33 defined as $K_3 * w_1 * \sin^2\theta$ and the output 35 defined as $K_3 * w_1 * \cos^2\theta$ from the respective multipliers 30 and 32. The input 35 is connected through a resistor 120 to the inverting input 122 of an op-amp 124. The input $K_3 * w_1 * \cos^2\theta$ (35) is also connected through a resistor 126 to the inverting input 122 of op-amp 124. The positive input 126 of op-amp 124 is connected to ground through a resistor 128. A feedback resistor 130 is connected across the input 132 and output 134 of op-amp 124.

In FIG. 1 resolver 1 is excited with a DC voltage either fixed or variable. The purpose for using one or the other is that by making the excitation variable one can actually have a rate output which has variable sensitivity. By varying the excitation DC voltage the sensitivity of the rate signal will change. This may be desirable if one needs very high sensitivity at low rates and not so high of sensitivity at much larger rates. If a fixed DC voltage is applied to resolver 1 then the sensitivity will be fixed.

Figure 2:
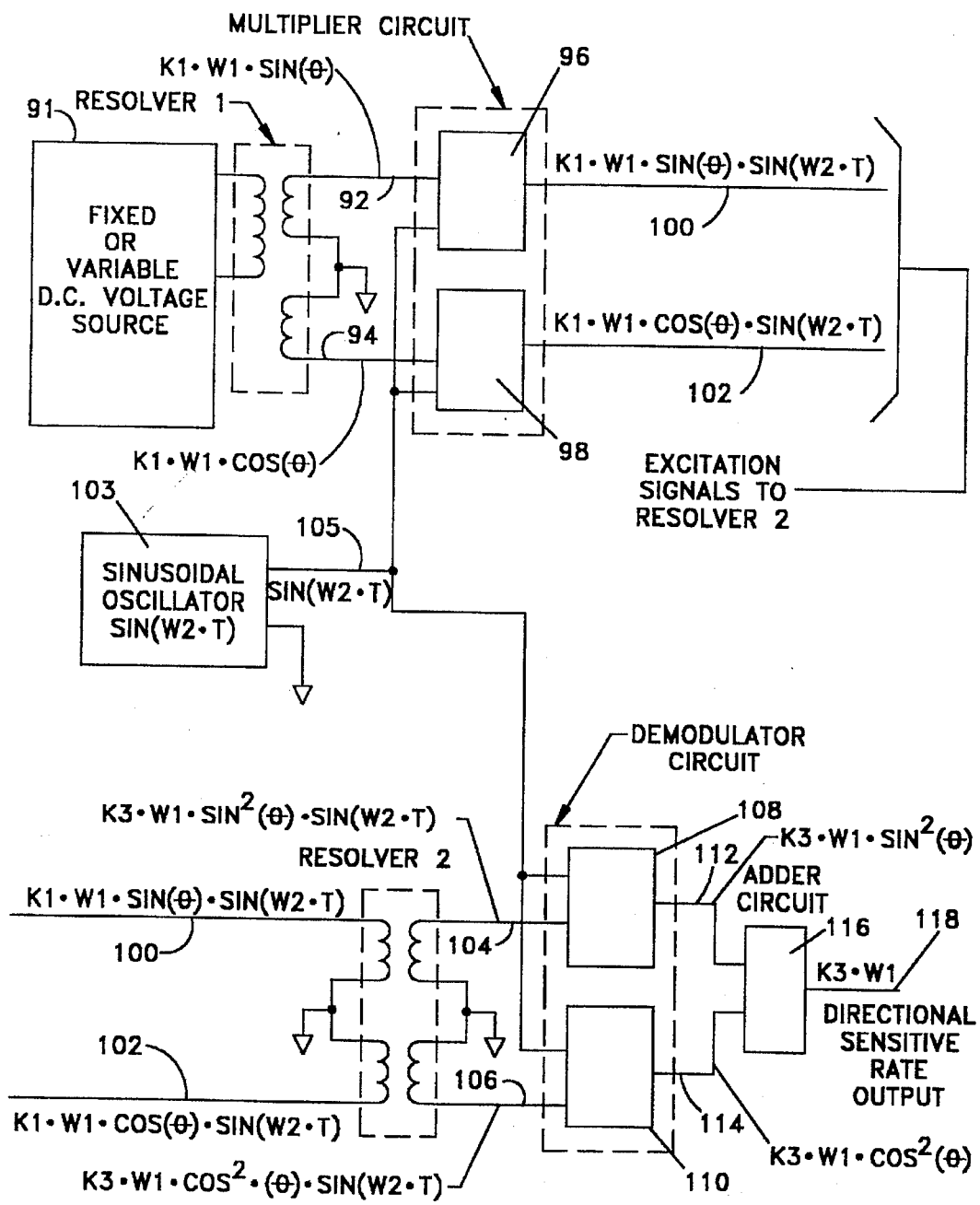
FIG. 2 is a block diagram of another embodiment of the present invention.

FIG. 2 illustrates an alternate embodiment of the present invention. In this embodiment, resolver 1 receives a DC voltage from a DC source 91 and has a pair of outputs 92 and 94 which are directed to and multiplied in a pair of multipliers 96 and 98 with the output 105 of a sinusoidal oscillator 103. The output 105 is defined by ($w_2 * t_1$). This produces the outputs 100 and 102 respectively from multipliers 96 and 98 which serve as inputs to resolver 2. Resolver 2 has two outputs 104 and 106 which serve as inputs to a pair of demodulator circuits 108 and 110 which demodulate the two signals. The demodulated output signals 112 and 114 are then added in an adder circuit 116 to provide a rate signal 118 which is the same as that discussed in the embodiment of FIG. 1. The circuitry of demodulator 108 and 110 as illustrated in FIGS. 4 and 5.

FIG. 5 illustrates the adder circuit 116 of FIG. 2 which is identical to the adder circuit of FIG. 1. As seen in FIG. 5 the output 112 from demodulator 108 is connected through a resistor 120 to the inverting input 122 of op-amp 124. The output 114 of demodulator 110 is also connected through a resistor 126 to the inverting input 122 of op-amp 124. The positive input 126 of op-amp 124 is connected to ground through a resistor 128. A feedback resistor 130 is connected across the input 132 and output 134 of op-amp 124.

Demodulator circuits 108 and 110 are identical to the demodulator circuits 24 and 26 as described in conjunction with FIG. 1 except that the input 104 to demodulator circuit 108 is received from resolver 2 and is defined by $K_3 * w_1 * \sin^2\theta * \sin(w_2 * t)$ and the input 106 to demodulator 110 is received from resolver 2 and is defined by $K_3 * w_1 * \cos^2\theta * \sin(w_2 * t)$ It is to be understood that the multiplier circuits 96 and 98 of FIG. 2 are identical to the multipliers 30 and 32 of FIG. 1; however, the inputs are different.

The multipliers and op-amps, as used in the implementation of the present invention may be similar to those manufactured by Burr-Brown and having part numbers MPY100G and OP-07A, respectively.

Figure 6:
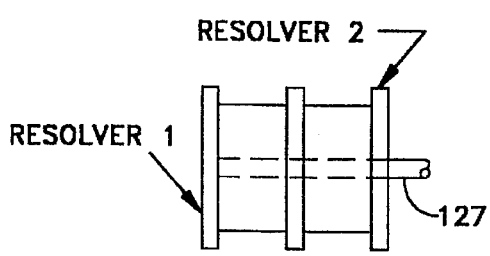
FIG. 6 is an elevational view of two resolvers mounted to the same shaft.

FIG. 6 illustrates the preferred arrangement of the resolver of the present invention. As seen in FIG. 6, both resolvers are shown to have a common shaft 127.

Figure 7:
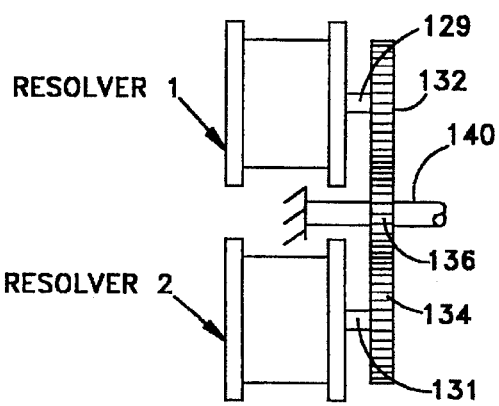
FIG. 7 is an elevational view of two resolvers mounted in side-by-side spaced relation with the output shafts of each resolver being rotatable at the same speed and coupled to a common output shaft.

FIG. 7 illustrates an alternate arrangement wherein resolvers 1 and 2 are mounted on separate shafts 129 and 131 which are rotated at the same speed. Each shaft 129 and 131 have respectively gears 132 and 134 secured thereto. An idler gear 136 connects these shafts for synchronous rotation thereof and provides an output through shaft 140.

One major advantage of this invention over many prior devices is that very robust brushless resolvers are the main components used in generating the rate signal. Resolvers have been historically proven to be very robust in space flight applications.

Another advantage is that in many applications a single resolver is already being utilized as a position sensor. Thus without degrading the position sensor another single resolver can be added yielding a very accurate rate sensor.

If used in a redundant system where two or more rate sensors are mounted to the same output shaft this invention possesses advantages over conventional rate sensors utilizing brushless DC motors or brush type DC tachometers. With these permanent magnet type rate sensors the back electromagnetic field (emf) is shorted out if there is a shorted winding failure in the devices. This creates a torque which the redundant system must overcome in order to drive the mechanism. The described invention has the luxury of removing the excitation signals from the resolvers. Because of this, if a shorted winding does occur the excitation signals can be removed to the resolvers resulting in no back emf to be shorted and no additional torque for the redundant system to overcome.

It is to be understood that if resolver 1 of FIG. 1 and 2 is excited by a variable DC voltage source then one has a rate sensor with variable sensitivity. This is not found in conventional sensors but can be of great use in systems requiring highly accurate rate signals over very large ranges. Depending on what range of rates are of interest at a particular time the sensitivity of the rate sensor could be adjusted accordingly. This can add flexibility and accuracy to a system.

While preferred embodiments have been specifically described herein, it is to be understood that various modifications may be resorted to that is within the spirit and scope of the appended claims. For example, a synchro (or three phase resolver) could also be used in this invention. The major difference being that the following trigonometric identity would be mechanized:

$$\sin^2(\theta)+\sin^2(\theta+120)+\sin^2(\theta+240)=1.5$$

where: $\theta$ is the shaft angle.

The circuit to implement this would be much like that shown in FIGS. 1 and 2. The only differences being that each resolver would have three output windings, requiring three demodulator circuits, and three multipliers. The three outputs from the multipliers would then be added as were the two outputs in FIG. 1 producing an output of:

$$1.5*K_3*w_1$$

Another embodiment of this invention would be for both resolvers to be wound in the same housing creating a single unit rate sensor.

I claim:

1. A dual brushless rate sensor comprising:
   first and second resolvers mechanically coupled to a common output shaft;
   a DC voltage source for exciting said first resolver for providing first and second output signals therefrom which are defined by sin and cosine trigonometric functions;
   an AC voltage source for exciting said second resolver for providing first and second output signals therefrom which are defined by sin and cosine trigonometric functions;
   circuit means for receiving and processing said output signals from said first and second resolvers to provide a directional sensitive rate output.

2. A dual brushless rate sensor as in claim 1 wherein said circuit means includes first and second demodulator circuits respectively disposed for receiving said first and second output signals from said second resolver and for respectively providing first and second demodulated output signals.

3. A dual brushless rate sensor as in claim 2 wherein said circuit means includes first and second multiplier circuits, said first multiplier circuit disposed for receiving said first output signal from said first resolver as a first input and said first output from said first demodulator circuit as a second input and for providing the product of said first and second inputs as an output, said second multiplier circuit disposed for receiving said second output signal from said first demodulator circuit as a first input and said second output from said second demodulator circuit as a second input and for providing the product of said first and second inputs as an output.

4. A dual brushless rate sensor as in claim 3 wherein said circuit means includes an adder circuit for receiving and adding said outputs from said first and second multiplier circuits to provide a directional sensitive rate output.

5. A dual brushless rate sensor as in claim 4 wherein said first demodulator circuit includes an op-amp having an inverting input, a non-inverting input and an output, said first output from said second resolver being connected as an input to said inverting input of said op-amp, a pair of resistors connected in said op-amp input in parallel relation, a feedback resistor connected across said input and said output of said op-amp, an induction coil and capacitor serially connected to said output of said op-amp, said capacitor also being connected to ground.

6. A dual rate sensor as in claim 5 wherein said second modulator circuit includes a second op-amp having an inverting input, a non-inverting input and an output, said second output from said second resolver being connected as an input to said inverting input of said second op-amp, a second pair of resistors connected in said second op-amp input in parallel relation, a second feedback resistor connected across said input and said output of said second op-amp, and a second induction coil and a second capacitor serially connected to said output of said second op-amp, said second capacitor also being connected to ground.

7. A dual brushless rate sensor as in claim 5 wherein said AC voltage source is a sinusoidal oscillator for generating first and second carrier frequency output signals, said carrier frequency output signals being connected to said non-inverting input of said op-amp and circuit means connected between said oscillator and said non-inverting input of said op-amp for transmitting said carrier frequency output signals to said op-amp, said circuit means including an op-amp having an inverting input, a non-inverting input and an output, first and second inputs connected to said first and second output signals of said oscillator, said first input being connected to said oscillator and through a first resistor to said inverting input of said op-amp and a second input connected to said oscillator and through a second resistor to said inverting input of said op-amp, and feedback resistor means connected across said input and said output of said op-amp.

8. A dual brushless rate sensor as in claim 1 wherein said circuit means includes first and second multiplier circuit means respectively disposed for receiving said first and second output signals from said first resolver and for respectively providing first and second multiplied output signals, said oscillator disposed for providing a carrier wave input to said first and second multiplier circuit means.

9. A dual brushless rate sensor as in claim 8 wherein said circuit means includes first and second demodulator circuit means disposed for receiving said first and second output signals from said second resolver and for providing respective first and second outputs, said second resolver disposed for receiving said first and second multiplied signals respectively from said first and second multiplier circuit means as first and second inputs to said second resolver.

10. A dual brushless rate resolver as set forth in claim 9 including an adder circuit for receiving said first and second outputs from said first and second demodulator circuits as an input and for summing said first and second inputs to provide a directional sensitive rate output.

11. A dual brushless rate sensor as in claim 10 wherein said first demodulator circuit includes an op-amp having an inverting input, a non-inverting input and an output, said first output from said second resolver being connected as an input to said inverting input of said op-amp, a pair of resistors connected in said op-amp input in parallel relation, a feedback resistor connected across said input and said output of said op-amp, an induction coil and capacitor serially connected to said output of said op-amp, said capacitor also being connected to ground.

12. A dual rate sensor as in claim 11 wherein said second modulator circuit includes a second op-amp having an inverting input, a non-inverting input and an output, said second output from said second resolver being connected as an input to said inverting input of said second op-amp, a second pair of resistors connected in said second op-amp input in parallel relation, a second feedback resistor connected across said input and said output of said second op-amp, and a second induction coil and a second capacitor serially connected to said output of said second op-amp, said second capacitor also being connected to ground.

13. A dual brushless rate sensor as in claim 12 wherein said AC voltage source is a sinusoidal oscillator for generating first and second carrier frequency output signals, said carrier frequency output signals being connected to said non-inverting input of said op-amp and circuit means connected between said oscillator and said non-inverting input of said op-amp for transmitting said carrier frequency output signals to said op-amp, said circuit means including an op-amp having an inverting input, a non-inverting input and an output, first and second inputs connected to said first and second output signals of said oscillator, said first input being connected to said oscillator and through a first resistor to said inverting input of said op-amp and a second input connected to said oscillator and through a second resistor to said inverting input of said op-amp, and feedback resistor means connected across said input and said output of said op-amp.

14. A dual brushless rate sensor comprising:
   first and second resolvers mechanically coupled to a common output shaft;
   A DC voltage source for exciting said first resolver for providing first and second outputs therefrom, said first output defined by $K_1*w_1*\sin\theta$, said second output defined by $K_1*w_1*\cos\theta$, where $\theta$ is the shaft angle, $w_1$ represents angular rate, and $K_1$ is a constant;
   an AC sinusoidal voltage source for providing an output defined by $\sin(w_2*t)$ for exciting said second resolver and for providing a first and second output from said second resolver, said first output defined by $K_2*\sin(w_2*t)*\sin\theta$ and said second output defined by $K_2*\sin(w_2*t)*\cos\theta$, where $\theta$ is the shaft angle, $\sin(w_2*t)$ is the excitation signal to the resolver, and $K_2$ is derived from the surface area of the resolver, the number of turns of the resolver and the magnitude of the excitation voltage;
   first demodulator circuit means disposed for receiving and demodulating said first output from said second resolver to provide a first demodulated signal defined by $K_2*\sin\theta$;
   second demodulator circuit means disposed for receiving and demodulating said second output from said second resolver to provide a second demodulated signal defined by $K_2*\cos\theta$;
   first multiplier circuit means for receiving said first output from said first resolver and said first demodulated signal from said first demodulator circuit means and for multiplying said first and second signals to provide a first multiplied output signal defined by $K_3*w_1*\sin^2\theta$, where $K_3$ is a constant equal to $K_1*K_2$ and $w_1$ represents the angular rate;
   second multiplier circuit means for receiving said second output from said first resolver and said second demodulated signal from said second demodulator circuit means and for multiplying said first and second signals to provide a second multiplied output signal defined by $K_3*w_1*\cos^2\theta$; and
   adder circuit means for receiving said first and second multiplied signals, adding said signals, and providing an output signal defined by $K_3*w$ which is indicative of a directional sensitive rate output.

15. A dual brushless rate sensor comprising:
   first and second resolvers mechanically coupled to a common output shaft;
   a DC voltage source for exciting said first resolver for providing first and second outputs from said first resolver, said first and second outputs respectively defined by $K_1*w_1*\sin\theta$ and $K_1*w_1*\cos\theta$, where $K_1$ is a constant, $\theta$ is the shaft angle and $w_1$ represents angular rate;
   first multiplier circuit means for receiving and multiplying said first output from said first resolver and said carrier wave output signal from said oscillator to provide a first multiplied output defined by $K_1*w_1*\sin\theta*\sin(w_2*t)$, where $K_1$ is a constant, $w_1$ represents the angular rate and $\theta$ is the shaft angle;
   second multiplier circuit means for receiving and multiplying said second output from said second resolver and said carrier wave signal from said oscillator to provide a second multiplied output defined by $K_1*w_1*\cos\theta*\sin(w_2*t)$, said first and second multiplied outputs serving as first and second inputs to said second resolver; said second resolver having first and second outputs, said first output defined by $K_3*w_1*\sin^2\theta*\sin(w_2*t)$ and said second output defined by $K_3*w_1*\cos^2\theta*\sin(w_2*t)$, where $K_3$ is a constant equal to $K_1*K_2$;
   first demodulator circuit means for receiving and demodulating said first output from said second resolver and providing a first demodulated output defined by $K_3*w_1*\sin^2\theta$;
   second demodulator circuit means for receiving and demodulating said second output from said second resolver and providing a second demodulated output defined by $K_3*w_1*\cos^2\theta$; and
   adder circuit means for receiving and adding said first and second demodulated outputs from said first and second demodulator circuit means for providing an output signal defined by $K_3*w$ which is indicative of a directional sensitive output.

* * * * *